June 27, 1933.                J. S. McWHIRTER                1,915,327
                          STEP MECHANISM FOR VEHICLES
                             Filed Feb. 26, 1931
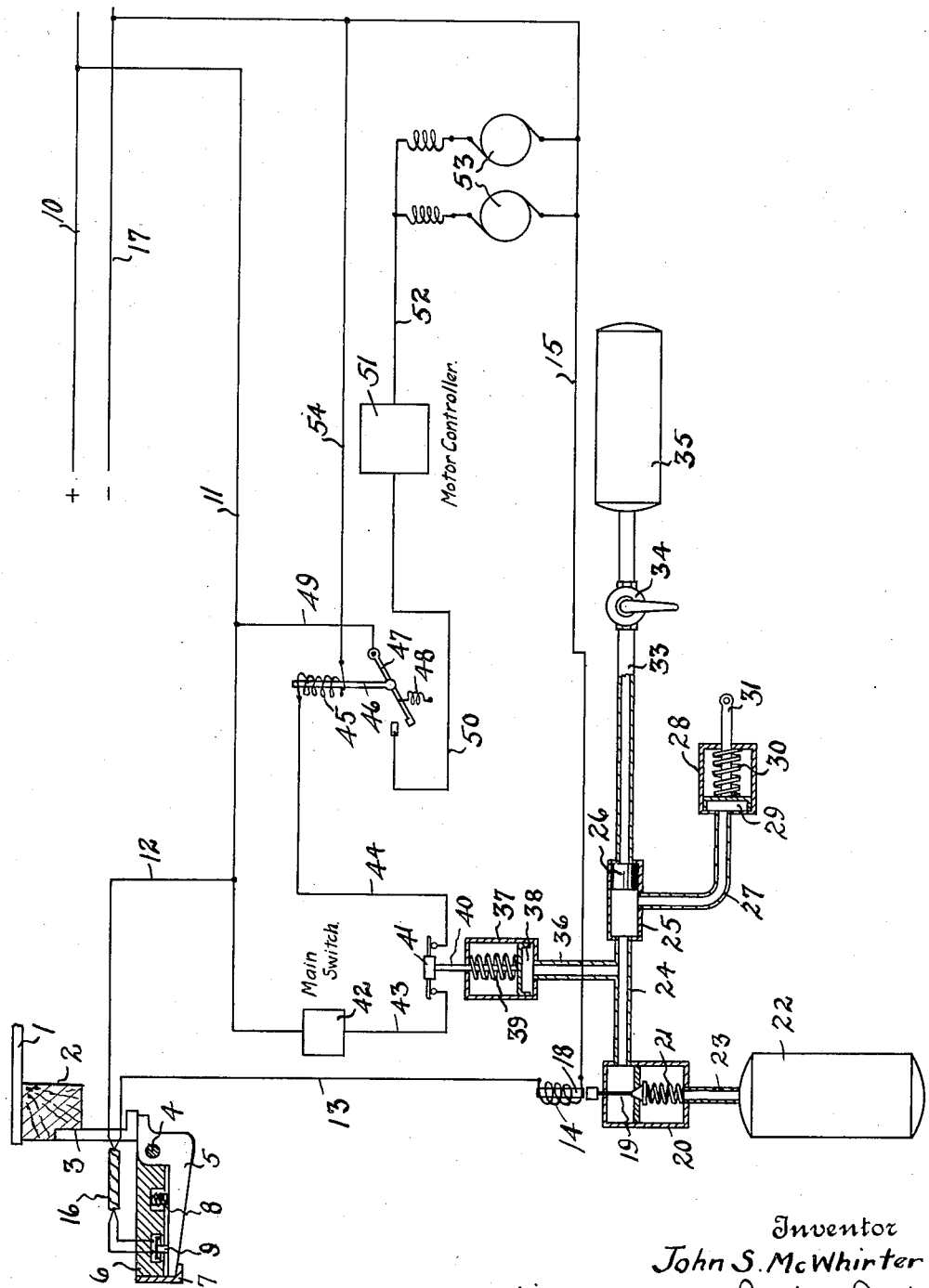
Inventor
John S. McWhirter
By his Attorneys Darby + Darby Patented June 27, 1933

1,915,327

UNITED STATES PATENT OFFICE

JOHN S. McWHIRTER, OF SOUTHPORT, CONNECTICUT, ASSIGNOR TO NATIONAL PNEUMATIC COMPANY, OF NEW YORK, N. Y., A CORPORATION OF WEST VIRGINIA

STEP MECHANISM FOR VEHICLES

Application filed February 26, 1931. Serial No. 518,480.

This invention relates to improvements in apparatus for use in connection with power controlled vehicles under the control of the step for preventing the movement of the vehicle while any pressure is applied to the step.

One of the objects of this invention is the provision of means operated by a specially constructed step of the folding or sliding type for controlling the propulsion apparatus of the vehicle, and the brake mechanism of the vehicle, for preventing the starting of the vehicle and for insuring the application of the brakes while a passenger is either standing on the step or is caught on the step by means of his clothing and the like.

A further object of this invention is the provision with the exit door of vehicles of a step operated control device for preventing the starting of the vehicle while a person is on the step, or any pressure is applied thereto, such as would result in the fact that a person's clothing is caught on the step.

A still further object of this invention is the provision in electrically propelled vehicles of control devices under the control of the step for preventing the starting of the vehicle while any pressure is applied on the step.

A still further object of the invention is the provision of a mechanism of this type for insuring the application of the brakes under these conditions independently of their operation by the vehicle operator.

These and many other objects as will appear from the following disclosure are secured by means of this invention.

This invention resides substantially in the combination, construction, arrangement and relative location of parts, all as will be described in greater detail below.

Referring to the drawing:

The figure is a diagrammatic and schematic layout with some parts in cross section of the system of this invention.

It is common practice today in transportation systems to provide exit doors at one end of a vehicle, such as street cars and buses, for example, and an entrance door at the other end of the vehicle which is adjacent the operator's door and vehicle control point. In the operation of such vehicles an accident hazard arises because of the fact that the exit way is remote from the operator, so that he cannot personally observe the conditions at the exit way. Such vehicles are now provided at the entrance and exit ways with power operated doors and steps operating in conjunction with each other. This invention involves a particular form of step construction for actuating a device for controlling both the propulsion apparatus of the vehicle and the brakes of the vehicle so as to prevent the operator from starting the vehicle if a person is on the exit step or is caught on it. The details of construction of a step of this nature is disclosed in my co-pending application Serial No. 518,481 filed February 26, 1931, now Patent Number 1,867,228 issued July 12, 1932.

From the following description it will be apparent that this invention is not limited to a control of the propulsion apparatus of the invention and the brakes, but may be easily applied to the control of the power device for operating the doors and steps if desired. With such an apparatus the prime object of preventing the starting of the vehicle before the entrance and exit ways, particularly the exit ways, are cleared, is attained.

The nature of the invention will now be described by detailed reference to the drawing. At 1 is shown the platform of the vehicle adjacent the exit way. At 2 is shown a portion of the frame of the vehicle, to which is secured and from which depend the step supporting brackets 3. The step is pivotally supported on a shaft 4 held in these brackets in accordance with well-known practice. It is pointed out here that this invention is described in connection with folding steps, but may be applied to steps moved in other ways, such as by sliding. Secured to the shaft 4 for rotation therewith are the step supporting arms 5, on which is supported the step tread 6. The tread 6 is loosely mounted on the shaft 4 and is provided with a plate 7 along its front edge which has a flange engaging the bottom of the outer ends of the arms 5. Springs 8 lie between the treads and the arms 5 and hold the tread in its raised position with respect to the arms, as shown in the drawing. The flange of plate 7 limits the upward movement of the tread. With this arrangement it is apparent that the tread is freely movable towards the arms 5 compressing springs 8. Within the tread are a pair of fixed contacts controlled by a push button 9 which projects externally of the tread downwardly so as to engage either the arms 5 or a fixed stop secured thereto. Thus, when the tread 6 is depressed the push button switch 9 is closed. Such a step construction is disclosed and described in greater detail in my co-pending application referred to above.

At 10 and 17 are the positive and negative leads from any suitable current source. Wire 10 is connected by wires 11 and 12 to one of the contacts of the push button switch. The other contact of this switch is connected by wire 13 to one terminal of the electromagnetic solenoid 14. Wires 12 and 13 may be closed within a flexible protecting covering to form a cable 16. The other terminal of solenoid winding 14 is connected by wire 15 to wire 17. Thus, when tread 6 is depressed to close the push button switch, solenoid winding 14 is energized.

The solenoid is provided with a downwardly movable plunger 18 which engages the stem of a valve 19 within the casing 20. Spring 21 normally holds this valve seated. The lower part of casing 20 is connected by a pipe 23 to a fluid pressure source 22. Casing 20 on the other side of the valve 19 is connected by pipe 24 to a double check valve, comprising a casing 25 and a movable plunger 26. Casing 25 is connected by pipe 27 to the brake cylinder 28. Within this cylinder is a movable piston 29 held in the position shown by means of a spring 30 and attached to a piston rod 31 which connects with the brake mechanism. Although one brake cylinder is shown, any number may be used by mere duplication in a well known manner. Extending from the end of the check valve casing 25, opposite to the end to which pipe 24 is connected, is a pipe 33 which extends through a controlling valve 34 to a fluid pressure source 35. It is, of course, apparent that a single fluid pressure source could be used in place of the sources 22 and 35. Likewise, if separate sources are used they could be of different pressures without interfering with the proper operation of this device.

Pipe 24 is connected by pipe 36 to a cylinder 37 within which operates a piston 38. A spring 39 holds piston 38 at the downward limit of movement, as shown. The movable contact 41 is connected to piston 38 by a piston rod 40. The contact 41 in its normal position, under the spring control 39, bridges two fixed contacts. One of these contacts is connected through wire 43 to a main switch 42 of any suitable construction. The other side of this switch is connected to wire 11. The other fixed contact is connected by wire 44 to one terminal of the electro-magnetic solenoid winding 45. The other terminal of this winding is connected by wire 54 to wire 17. 46 is a plunger for the solenoid which moves upwardly when the solenoid is energized. This plunger is pivotally connected to a pivotally supported switch arm 47 which is normally held in the position shown by a spring 48. Switch arm 47 is connected by wire 49 to wire 11. The fixed cooperating contact for switch arm 47 is connected by wire 50 to one side of the motor controller 51 of any well-known construction. The other terminal of this controller 51 is connected by wire 52 to the vehicle propulsion motors 53 which are connected at their other side to wire 17.

In describing the operation of this apparatus, it will first be assumed that the vehicle is in motion and the brakes released. To stop the vehicle the operator moves his controller 51 to "off" position, deenergizing the propulsion motors 53. He then moves the handle of control valve 34, which may be of the simple well-known three-way type, to a position to deliver fluid pressure from source 35 through pipe 33 to the double check valve. Plunger 26 moves to the left, closing off pipe 24 and connecting pipe 27 to pipe 33. The fluid pressure then moves piston 29 and piston rod 31 to the right to apply the brakes and compress spring 30. When valve 34 is moved back to its normal position, the supply of fluid pressure source is cut off and cylinder 28 is open to the atmosphere through pipes 27 and 33. Spring 30 is then free to release the brakes.

Assuming, however, that the brakes have been applied as previously described and the door adjacent to the steps shown is open and the step is rotated to the open position as shown, when a passenger steps on the tread 6 it is depressed and switch 9 closes. Current then flows from wire 10 through wire 11, wire 12, switch 9, wire 13, solenoid 14 and wire 15 back to wire 17. Solenoid 14 being energized, the plunger 18 descends and causes valve 19 to open and spring 21 to compress. Fluid pressure is then delivered from source 22 through pipe 23, casing 20 to pipe 24. With valve 34 in the position to deliver fluid pressure to the brake cylinder and the fluid pressure the same in the two sources 22 and 35, plunger 26 which is to the left will not move.

If the pressure in source 22 is greater than in pipe 33, plunger 26 will move to the right and the brakes will remain applied. Under either condition of pressure, should the operator try to release his brakes by moving valve 34 back to normal position, pressure will still be supplied to the brake cylinder from the source 22, or, if the two sources are the same, from the same source through the branch connection provided by pipe 23, casing 20 and pipe 24. It will thus be seen that a single fluid pressure source may be used, two separate sources as shown of the same pressure, or two separate sources of different pressures, without interfering with the correct operation of the system. The opening of valve 19 also supplies fluid pressure through pipe 36 to cylinder 37. Piston 38 moves upwardly compressing spring 39 and carrying piston rod 40 and contact 41 upwardly to break the circuit to solenoid 45. The switch which this solenoid controls may be closed, but when solenoid 45 is deenergized spring 48 opens this switch, so that even if the operator moves his controller 51 to "on" position, motors 53 will not be energized and the vehicle cannot move. It will thus be seen that so long as a person is on the step or any pressure is applied thereto, such as would be caused if the clothing of a person or other object pressed against the tread, the brakes will remain applied or be applied and the vehicle operator cannot start the vehicle. As soon as the step is cleared, solenoid 14 is deenergized, cutting off the supply of fluid pressure through valve 19. Thus, contact 41 is free to bridge its contacts under the action of spring 39, with the result that solenoid 45 will be energized to close its switch which is in the main circuit to the controller 51. Thus, the propulsion apparatus of the vehicle is put back under the control of the operator as soon as the step is clear.

Also, as soon as the step is cleared, solenoid 14 is deenergized and the supply of fluid pressure is cut off through valve 19. The fluid under pressure in pipe 24 escapes to atmosphere through valve 19. Then if fluid pressure is still in pipe 33, shuttle 26 of valve 25 moves over to the left and the fluid pressure in pipe 33 is connected to pipe 27, thus holding the vehicle brakes applied by means of piston 29 and piston rod 31. Thus, the brake apparatus of the vehicle is put back under the control of the operator as soon as the step is clear.

Should the operator already have moved valve 34 to the release position when the step is cleared, then there will be no pressure in pipe 33, shuttle 26 of valve 25 will have moved over to the right, and the fluid pressure in cylinder 28 and pipe 27 is free to escape to atmosphere through valve 25, pipe 24 and valve 19. This permits spring 30 to return piston 29 to its off position, thereby releasing the brakes of the vehicle which are operated by piston rod 31.

It will, of course, be apparent that this invention may be easily applied to vehicles controlled by internal combustion engines, such as automobile buses, by putting switch 47 in control of the ignition of the internal combustion engine, for example. Also, should pressure be applied to the step tread 6 after the vehicle has started switch 9 will close and cause solenoid 18 to operate to cut off propulsion power and apply the brakes of the vehicle as previously described. These operation combine to stop the vehicle. This invention could, of course, be applied other ways to the control of such an engine.

From the above description, it will be apparent that this invention involves certain principles of construction and operation which may be embodied in other physical forms without departing from the spirit and scope thereof. I do not, therefore, desire to be strictly limited to the disclosure as given for purposes of illustration, but rather to the scope of the appended claims.

What I seek to secure by United States Letters Patent is:

1. The combination with the step of a vehicle, of brake apparatus for the vehicle, propulsion means for the vehicle, and means controlled by the step for applying the brakes or preventing their release being applied and for preventing the operation of the means for propelling the vehicle whether energized or not while their is pressure on the step.

2. The combination as described, comprising electric motors for propelling a vehicle, circuits for said motors including a normally closed switch, electro-magnetic means for holding the switch normally closed, circuits for said electro-magnetic means, a fluid pressure operated switch for normally closing the circuit to said means, a movable step, and means controlled by the step when pressure is applied thereto for supplying fluid pressure to the fluid pressure operated switch to cause it to open.

3. The combination with the folding step of a vehicle, said step having a movable tread, of a switch associated with the tread to be operated when pressure is applied thereto, vehicle propulsion apparatus having control circuits, and means for opening the control circuits whenever said switch is operated by the application of pressure to the movable tread in any position of the step.

4. A combination as described comprising a folding step for a vehicle, motive means for moving the vehicle, and means controlled by the step for deenergizing the motive means if energized when pressure is applied to the step either in open or closed position.

5. The combination with a step of a vehicle of brake apparatus for the vehicle, propulsion means for the vehicle, an on and off controller for the propulsion means, and means operated by pressure on the step for operating the brakes or maintaining them operated if applied and for removing the controller from control of the propulsion means whether in on or off position.

6. A combination as described comprising a folding step for a vehicle, brake apparatus for the vehicle, and means controlled by the step for maintaining the brake apparatus operated to hold the brakes in applied position, or to apply the brakes when pressure is applied to the step either in open or closed position.

In testimony whereof I have hereunto set my hand on this 31st day of January A. D., 1931.

JOHN S. McWHIRTER.